US009512639B2

(12) United States Patent
Schulte et al.

(10) Patent No.: US 9,512,639 B2
(45) Date of Patent: Dec. 6, 2016

(54) SECURITY SHIELD FOR GARAGE DOOR RELEASE MECHANISM

(71) Applicants: Fredrick Charles Schulte, West Hills, CA (US); Gary H. Mason, Agoura Hills, CA (US); Julia Schulte Maddox, Torrence, CA (US)

(72) Inventors: Fredrick Charles Schulte, West Hills, CA (US); Gary H. Mason, Agoura Hills, CA (US); Julia Schulte Maddox, Torrence, CA (US)

( * ) Notice: Subject to any disclaimer, the term of this patent is extended or adjusted under 35 U.S.C. 154(b) by 229 days.

(21) Appl. No.: 14/323,063

(22) Filed: Jul. 3, 2014

(65) Prior Publication Data

US 2015/0184421 A1 Jul. 2, 2015

Related U.S. Application Data

(60) Provisional application No. 61/964,144, filed on Dec. 26, 2013.

(51) Int. Cl.

| | |
|---|---|
| ***F16M 13/00*** | (2006.01) |
| ***E05B 13/00*** | (2006.01) |
| ***E05B 17/20*** | (2006.01) |
| ***E05B 65/00*** | (2006.01) |

(52) U.S. Cl.
CPC ......... *E05B 13/001* (2013.01); *E05B 17/2084* (2013.01); *E05B 65/0021* (2013.01); *E05B 17/2003* (2013.01); *Y10T 292/79* (2015.04)

(58) Field of Classification Search
CPC ............. E05B 13/001; E05B 65/0021; E05B 17/2084; E05B 17/2003; E05C 19/18
See application file for complete search history.

(56) References Cited

U.S. PATENT DOCUMENTS 8,403,022 B2 * 3/2013 Womacks ............. E05F 15/668 160/188
2012/0019011 A1 * 1/2012 Laborde ................ E05B 13/001 292/1
2012/0043030 A1 * 2/2012 Shepherd .................. E06B 5/11 160/188
2012/0138240 A1 * 6/2012 Womacks ............. E05F 15/668 160/32

* cited by examiner

*Primary Examiner* — Amy Sterling
(74) *Attorney, Agent, or Firm* — Burns & Levinson LLP; John C. Serio

(57) ABSTRACT

A security shield to cover a release mechanism for a motorized garage door opener provides an enclosure adapted for location around an overhead guide rail release mechanism and a blocking shield including a device for attaching the blocking shield and the enclosure to the connecting member.

7 Claims, 6 Drawing Sheets

SECURITY SHIELD FOR GARAGE DOOR RELEASE MECHANISM

CROSS REFERENCE TO RELATED APPLICATIONS

This application claims priority from U.S. Provisional Patent Application Ser. No. 61/964,144, filed Dec. 26, 2013 and incorporated herein by reference in its entirety.

FIELD OF THE INVENTION

The present invention generally relates to security devices for motorized garage door openers, and in particular to such devices which limit access to emergency release mechanisms on such garage door openers.

BACKGROUND OF THE INVENTION

Common residential garage door openers typically include a horizontal drive mechanism that connects to the top middle of a garage door. Security for preventing unauthorized access through the garage door is provided by an encoded remote control receiver that causes activation of the garage door opener only upon receipt of the proper encoded wireless signal. The horizontal drive mechanism typically includes a guide track, a drive mechanism and means for connecting the garage door to the drive mechanism. The connection point to the drive mechanism also typically includes an emergency release mechanism to allow the garage door to be manually opened in the event of a power outage. The emergency release mechanism typically includes a short rope and handle to enable release of the door by applying downward tension to the rope. Unfortunately, this safe and convenient release arrangement has been a target of burglars who disengage the release mechanism by using a stiff wire, such as a clothing hanger with a hook, to reach through a crack between the garage door and door frame to access the release mechanism and the rope handle.

Therefore, it is desirable to enable home owners to prevent such malicious access to the release mechanism.

SUMMARY OF THE INVENTION

One embodiment of the present invention provides a security shield to cover a release mechanism for a motorized garage door opener, comprising: an enclosure adapted for location around an overhead guide rail release mechanism, wherein the enclosure surrounds sides and a bottom of the release mechanism leaving a first opening on a top side of the enclosure to allow clearance for the release mechanism and a connecting member to a garage door, and a second opening facing opposite the connecting member to allow manual access to the release mechanism; and a blocking shield including a device for attaching the blocking shield and the enclosure to the connecting member, the blocking shield extending toward the release mechanism to block access to the release mechanism through the first opening.

The device for attaching the blocking shield and the enclosure to the connecting member may include a pair of bolts which prevent rotation of both the blocking shield and the enclosure. The enclosure and the blocking shield may be constructed with rolled steel. The enclosure may include a piece of rolled steel that wraps around a bottom and sides of the release mechanism. The enclosure may also cover a portion of a top side.

The enclosure may be formed from a semicircular-shaped blank having four radially directed fold lines in the semicircular shape, which fold lines create three full sides of the enclosure, a partial fourth side and opposing minimal and larger end openings when the blank is folded to 90° along each of the four radially directed fold lines. The parital fourth side may form the first opening and the larger opening may be the second opening. The semicircular shaped blank may also includes a pair of tabs extending from radially opposite sides of the semicircular shape to form attachment tabs for the enclosure to the connecting member.

BRIEF DESCRIPTION OF THE DRAWINGS

The present invention is illustratively shown and described in reference to the accompanying drawings, in which.

DETAILED DESCRIPTION OF THE DRAWINGS

Figure 1:
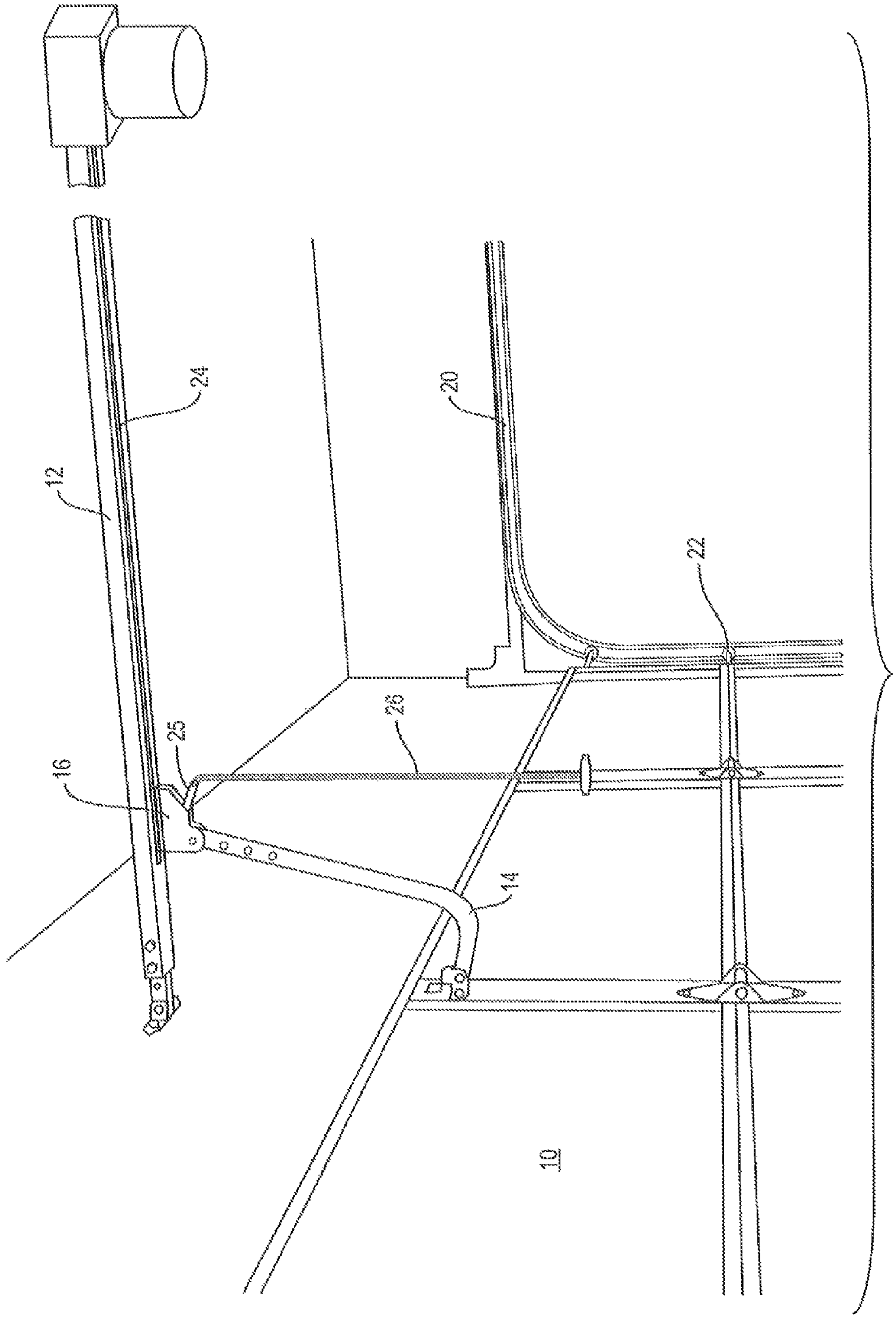
FIG. 1 is a perspective view of a garage door attached to a motorized garage door opener.

FIG. 1 shows a portion of a garage door 10 coupled to a motorized garage door opener 12 by means of a connecting member 14 and a release mechanism 16. Generally, garage door 10 is supported at opposing ends by a weight bearing rail 20 engaged by wheels 22 mounted to garage door 10. Garage door opening mechanism 12 typically includes an overhead guide rail 24 and an inner drive mechanism (not shown) of any suitable means, such as a motor driven chain (not shown). The internal drive mechanism is connected to connecting member 14 by a release mechanism 16 which serves a dual purpose of providing connection with the drive mechanism and also allowing release or disconnection from the drive mechanism by manual activation of lever 25 via tension on a pull rope 26.

Figure 2:
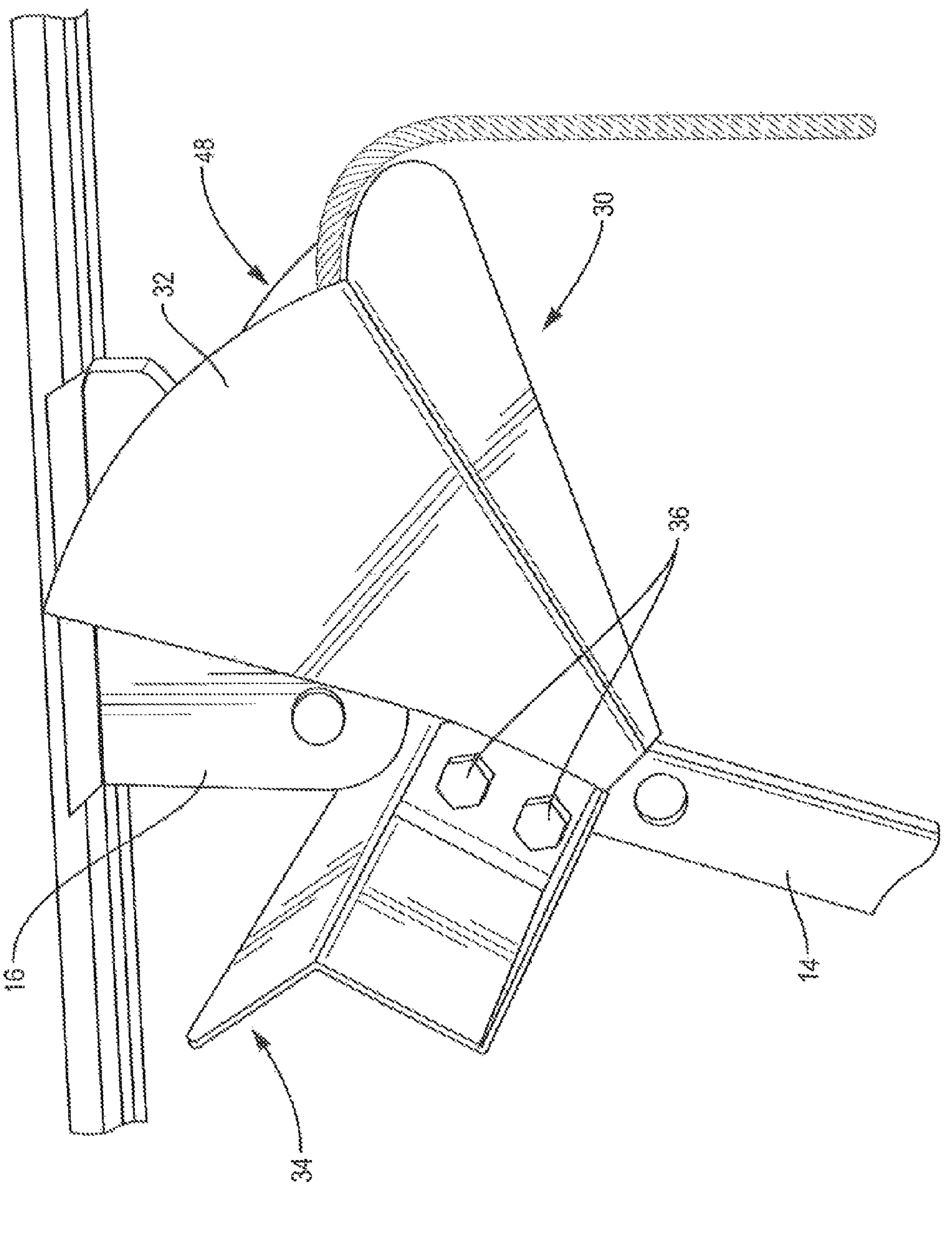
FIG. 2 is a perspective view of a release mechanism for connecting a garage door to a motorized garage door opener as shown in FIG. 1 and including an embodiment of the present invention.

FIG. 2 shows a close-up view of the interconnection between connecting member 14 and release mechanism 16 including an embodiment of the present invention in the form of security shield 30. Security shield 30 includes an enclosure 32 and a blocking shield 34 and is attached to connecting member 14 by two bolts 36, which bolts 36 also interconnect enclosure 32 and blocking shield 34.

Figure 3:
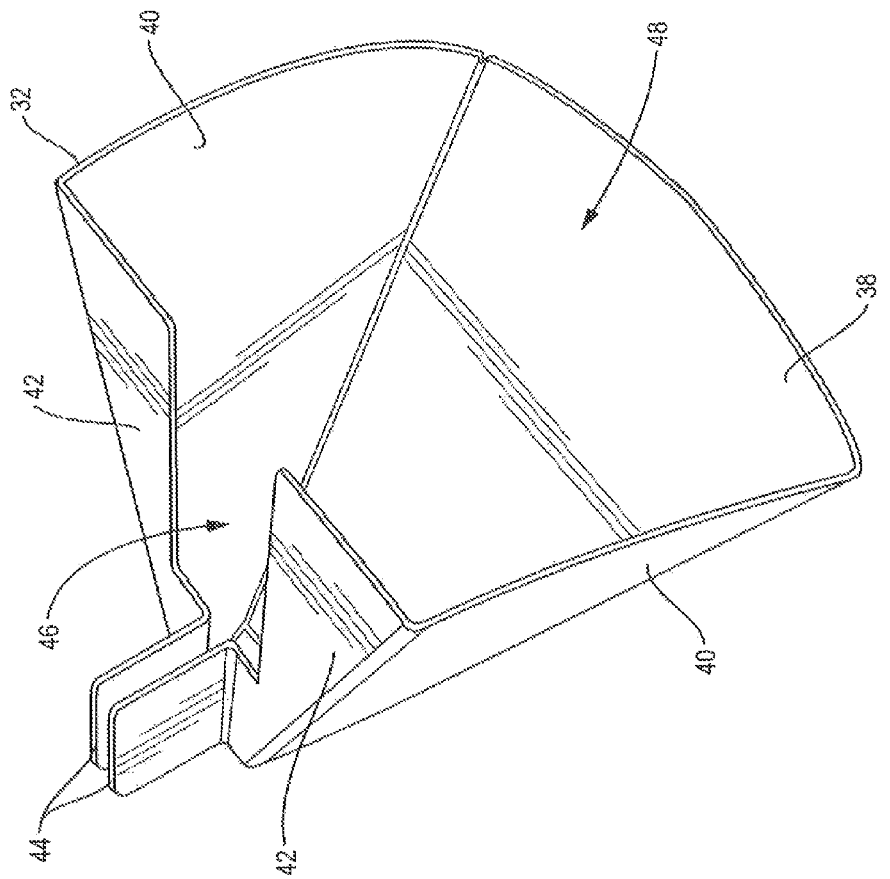
FIG. 3 is a perspective view of a detached member of the embodiment of the present invention of FIG. 2.

FIG. 3 shows a perspective view of the enclosure 32 of FIG. 2. Enclosure 32 is constructed from metal, such as rolled steel, to have a bottom portion 38, side portions 40, top portions 42 and attachment tabs 44. Top portions 42 are sized and shaped to leave a top opening 46 for location and installation around a portion of release mechanism 16 and connecting member 14 of FIG. 2. Enclosure 32 also includes an opening 48 located to face away from connecting member 14 with installation and thereby allow manual access to lever 25 of release mechanism 16.

Figure 4:
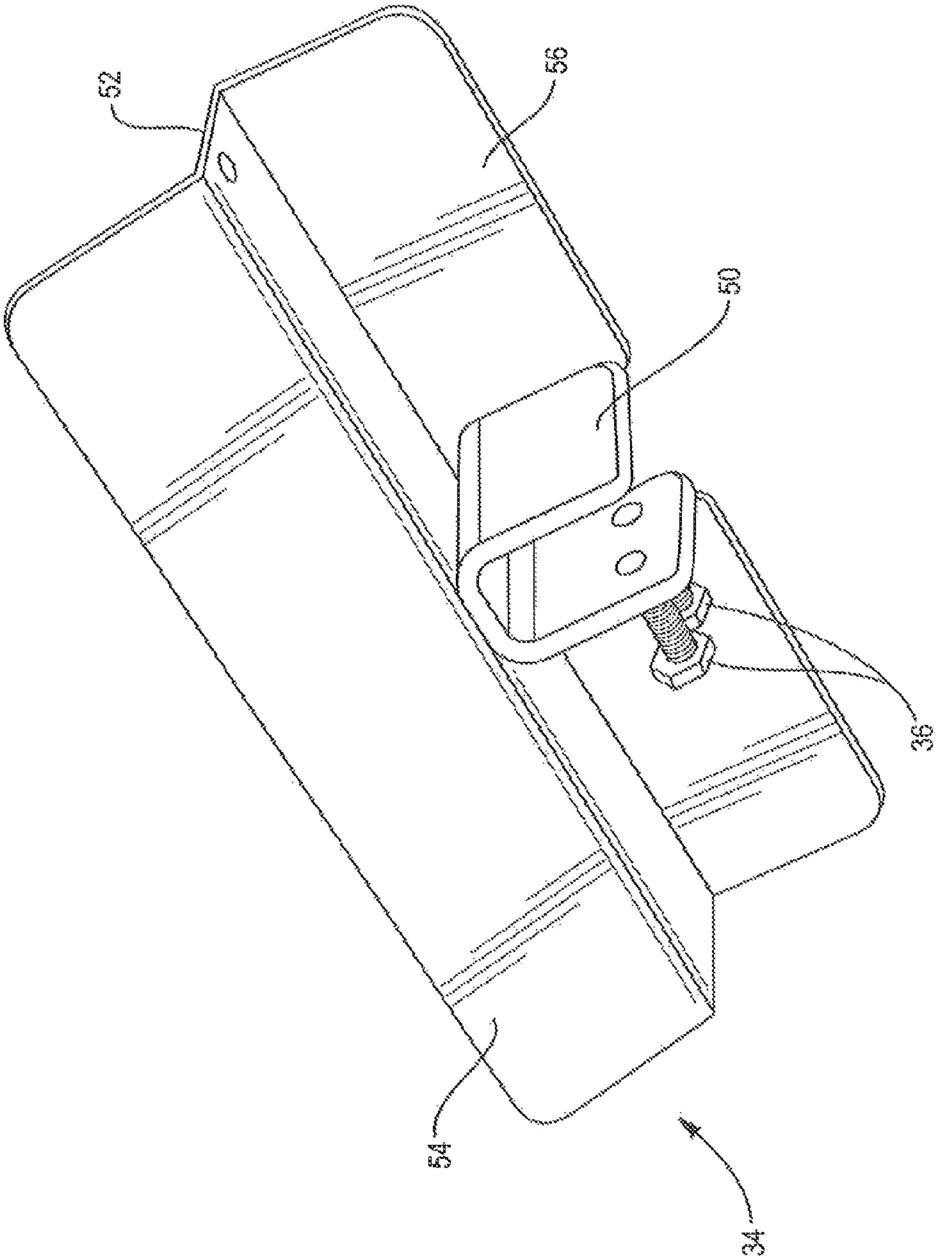
FIG. 4 is a perspective view of another detached member of the embodiment of FIG. 2.

FIG. 4 is a perspective view of blocking shield 34 which includes a clamp 50 adapted for threadably mounting bolts 36. A back member 52 of blocking shield 34 provides a secure connection to clamp 50, along with upper shield portion 54 and a two-part lower shield portion 56. By this arrangement, blocking shield 34 and clamp 50 provide a means for interconnecting blocking shield 34 and enclosure 32 to each other and to connecting member 14.

Figure 5:
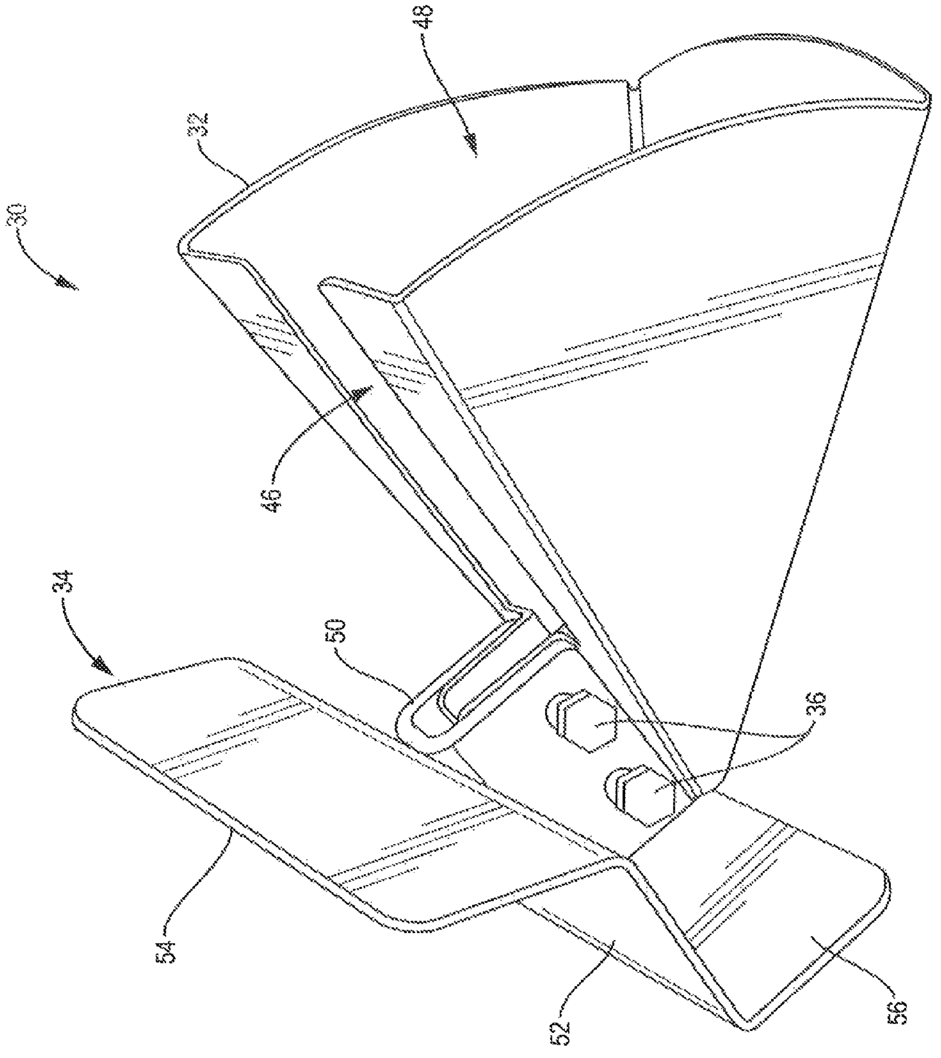
FIG. 5 is a perspective view of the members of FIGS. 3 and 4 attached to each other.

FIG. 5 shows the security shield 30 including enclosure 32 and blocking shield 34 interconnected. Enclosure 32 is approximately 5.5 inches long and opening 48 is approximately 4.5 inches wide by 4 inches tall. Slot 46 is approximately 3.5 inches long and 1.25 inches wide. Blocking shield 36 is approximately 7 inches long and each of the back portion 52, upper shield portion 54 and two-part lower shield portion 56 is approximately 1.5 inches wide.

FIGS. 2 and 5 best illustrate the interaction of those members in combination with release mechanism 16. Clamp 50 readily provides connection of security shield 30 to connecting member 14, enclosing lever 25 of release mechanism 16. Opening 46 of enclosure 32 straddles opposing sides of release mechanism 16 and, and opening 48 enables manual access to lever 25 of release mechanism 16. Blocking shield 34, including its back portion 52, upper shield portion 54 and two-part lower shield portion 56 effectively blocks all direct or line-of-sight access through opening 46 to lever 25. The use of two bolts 36 prevents rotation of the installed shield.

In this manner, a stiff wire inserted around garage door 10 cannot be used to activate release mechanism 16 because all the direct access to release lever 25 for such a wire is prevented and because pulling the release rope towards garage door 10 is ineffective.

Figure 6:
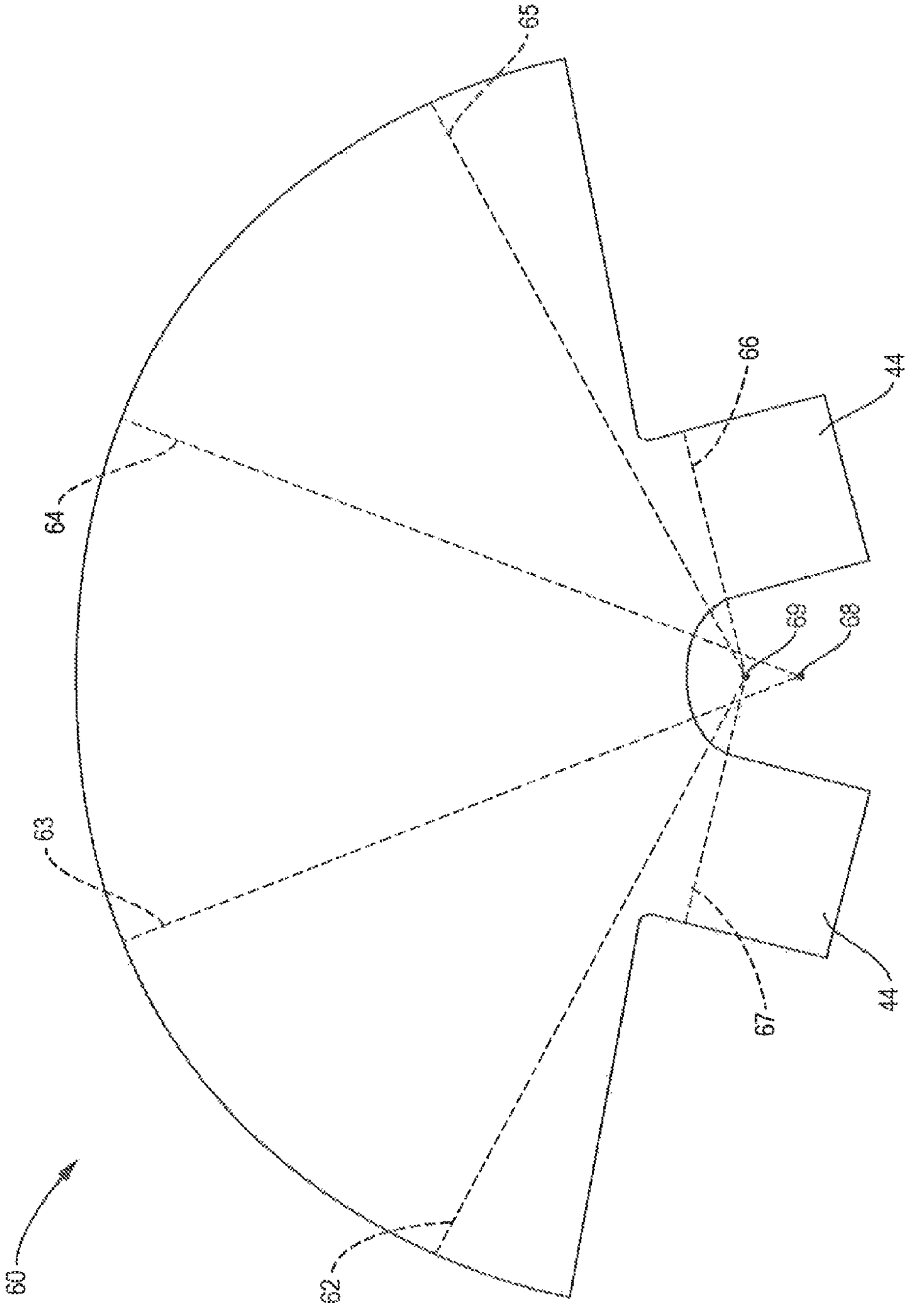
FIG. 6 is a top view of a blank which can be folded to form the detached member of FIG. 3.

Construction of shield 30 may be accomplished by any suitable means, including the bending of a rolled steel blank 60 shown in FIG. 6 for creating enclosure 32 (FIG. 3). Blank 60 is almost semicircular in shape and the housing portion of enclosure 32 is formed by bending the longer bend lines 62-66 inward at 90° angles. Bend lines 62-65 are radially directed within the semicircular shape of blank 60 at angles of approximately 40° between adjacent fold lines 62-65. In one embodiment, fold lines 63, 64 share a first intersection point 68, while fold lines 62, 65-67 share a second intersection point 69 which is located inward from point 68. When the blank is bent to 90° along bend lines 62-65 it forms three full sides and a fourth partial side of enclosure 32 and leaves a minimal first opening at one end and a larger second opening 48 (FIGS. 3 and 5). Sequentially, blank 60 is first bent upward relative the drawing sheet along longer bend lines 62 and 65. Then shorter bend lines 66, 67 are bent in the opposite direction to create tabs 44 for attachment to connecting member 14. Lastly, longer bend lines 63 and 64 are used to complete enclosure 32.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A security shield to cover a release mechanism for a motorized garage door opener, comprising:

an enclosure adapted for location around an overhead guide rail release mechanism, wherein the enclosure surrounds sides and a bottom of the release mechanism leaving a first opening on a top side of the enclosure to allow clearance for the release mechanism and a connecting member to a garage door, and a second opening facing opposite the connecting member to allow manual access to the release mechanism; and a blocking shield including a device for attaching the blocking shield and the enclosure to the connecting member, the blocking shield extending toward the release mechanism to block access to the release mechanism through the first opening, wherein the device for attaching the blocking shield and the enclosure to the connecting member includes a pair of bolts which prevent rotation of both the blocking shield and the enclosure.

2. The security shield of claim 1, wherein the enclosure and the blocking shield are constructed with rolled steel.

3. The security shield of claim 1, wherein the enclosure includes a piece of rolled steel that wraps around a bottom and sides of the release mechanism.

4. The security shield of claim 3, wherein the enclosure also covers a portion of a top side.

5. The security shield of claim 1, wherein the enclosure is formed from a semicircular-shaped blank having four radially directed fold lines in the semicircular shape, which fold lines create three full sides of the enclosure, a partial fourth side and opposing minimal and larger end openings when the blank is folded to 90° along each of the four radially directed fold lines.

6. The security shield of claim 5, wherein the partial fourth side forms the first opening and the larger opening is the second opening.

7. The security shield of claim 5, wherein the semicircular shaped blank also includes a pair of tabs extending from radially opposite sides of the semicircular shape to form attachment tabs for the enclosure to the connecting member.

* * * * *